US011792252B2

(12) United States Patent
Chen et al.

(10) Patent No.: US 11,792,252 B2
(45) Date of Patent: Oct. 17, 2023

(54) CONVERTING AN RTSP COORDINATED STREAM INTO AN HLS STREAM

(71) Applicant: Turing Video, San Mateo, CA (US)

(72) Inventors: Weiwei Chen, Belmont, CA (US); Chien-Yu Chen, San Mateo, CA (US)

(73) Assignee: TURING VIDEO, San Mateo, CA (US)

( * ) Notice: Subject to any disclaimer, the term of this patent is extended or adjusted under 35 U.S.C. 154(b) by 38 days.

(21) Appl. No.: 17/207,240

(22) Filed: Mar. 19, 2021

(65) Prior Publication Data

US 2022/0303326 A1 Sep. 22, 2022

(51) Int. Cl.
*H04L 65/75* (2022.01)
*H04L 65/65* (2022.01)

(52) U.S. Cl.
CPC .............. *H04L 65/75* (2022.05); *H04L 65/65* (2022.05)

(58) Field of Classification Search
CPC ........... H04N 21/84; H04N 21/234336; H04N 21/44008; H04N 21/6373; H04N 21/6175; H04N 21/4223; H04N 5/23206; H04L 67/02; H04L 65/65
See application file for complete search history.

(56) References Cited

U.S. PATENT DOCUMENTS

| 2014/0075015 A1* | 3/2014 | Chan ...................... H04L 41/22 709/224 |
| 2016/0149977 A1* | 5/2016 | Addy ...................... H04L 65/61 709/231 |
| 2019/0325484 A1* | 10/2019 | Littlejohn .............. G06Q 30/02 |
| 2021/0312948 A1* | 10/2021 | Haley ................ H04N 21/2743 |

OTHER PUBLICATIONS

Implementation of HTTP Live Streaming for an IP Camera using an Open Source Multimedia Converter; international Journal of Software Engineering and Its Applications vol. 8, No. 6 (2014), pp. 39-50 (Year: 2014).*

* cited by examiner

*Primary Examiner* — Hitesh Patel

(57) ABSTRACT

The present invention extends to methods, systems, and computer program products for converting an RTSP coordinated stream into an HLS stream. A server participates essentially simultaneously in an RTSP coordinated stream with a content creating electronic device (e.g., a camera) and in an HLS stream with the end-point (e.g., a Web browser). The media server receives a portion of RTSP stream data directly from the content creating electronic device. The media streaming server converts the portion of RTSP stream data into HLS stream data. The media streaming server sends the HLS stream data via the HLS stream to the end-point. The end-point or an end-point user may subsequently request termination of content streaming. In response to an HLS terminate instruction, the streaming media server can coordinate (e.g., concurrent) termination of both the RTSP coordinated stream and the HLS stream.

10 Claims, 7 Drawing Sheets

CONVERTING AN RTSP COORDINATED STREAM INTO AN HLS STREAM

TECHNICAL FIELD

The present disclosure relates generally to converting between streaming formats, and, more particularly, to converting an RTSP coordinated stream into an HLS stream.

BACKGROUND

Hypertext Transfer Protocol ("HTTP") is an application layer protocol for distributed, collaborative, hypermedia information systems. HTTP is a foundational protocol utilized on the Internet, where hypertext documents include hyperlinks to other resources that a user can easily access, for example by a mouse click or by tapping the screen in a web browser.

A variety of other protocols are built on HTTP. For example, HTTP Live Streaming ("HLS") protocol is an HTTP-based adaptive bitrate streaming communications protocol. Support for outputting HLS data streams is widespread in media players, web browsers, mobile devices, and streaming media servers due. HLS has a variety of advantageous features including stream configuration as smaller HTTP-based file downloads, ability to traverse firewalls, built in Digital Rights Management (DRM) support, cross browser compatibility, no need to install browser plug-ins, etc.

Although HLS is a preferred streaming protocol in many environments, devices often lack inherent capabilities to create/output an HLS stream. For example, many devices and servers natively output streams that are initiated and/or controlled using Real Time Streaming Protocol (RTSP). RTSP servers often use the Real-time Transport Protocol (RTP) in conjunction with Real-time Control Protocol (RTCP) for media stream delivery. However, some vendors alternatively implement other proprietary transport protocols coordinated by RTSP.

It is often technically and/or financially impractical to add HLS support to existing devices, such as, consumer electronics, through retrofitting or conversion procedures. Many existing devices are "hard coded" to utilize an RTSP based protocol set. The cost of modifying such devices would often exceed that of creating a newer similar device that natively supports HLS. For example, RTSP is the majority protocols used by many cameras, especially security cameras. To implement RTSP, cameras can include internal hardware components and fixed software configured to stream audio/video data using RTSP and related protocols. Accessing internal components may be difficult and cause damage to other external components in the process. Further, even if access to internal components is gained, it may require considerable technical skill and advanced computing resources to re-program the internal components.

Additionally, devices can be tailored to stream data to media servers configured (and possibly also tailored) to ingest streaming data associated with a particular protocol. The ingesting media server can then deliver the streaming data to an end-point, such as, a Web browser. For example, a device using RTSP based protocol sets can be tailored to deliver RTSP based data streams to an RTSP server. The RTSP server can be configured to ingest RTSP based data streams and in turn forward the RTSP based data streams to end-points. However, there is no guarantee that an end-point is compatible with and/or is optimally configured for use with a specified streaming format and/or protocol. For example, an end-point may perform better when handling HLS streams relative to RTSP based streams or may only be compatible with HLS streams (e.g., does not have an RTSP plug-in installed).

Due at least in part to difficulties associated with adding HLS support to existing devices, tailored stream delivery between devices and media servers, and end-point underperformance and/or incompatibilities, utilizing other intermediary computing resources to convert streams from RTSP formats to HLS is typically more feasible.

FIG. 1A depicts a prior art network arrangement 100 utilized to convert an RTSP based stream to an HLS stream. Camera 101 creates content. For example, components in camera 101 (e.g., sensors, lenses, processors, etc.) interoperate to capture audio and/or video content. Camera 101 transfers the created content to RTSP server 102 in RTSP stream 111A (e.g., an audio/video stream). Upon ingesting RTSP stream 111A, RTSP sever 102 associates RTSP stream 111A with Uniform Resource Locator (URL) 113. RTSP server 102 sends RTSP notification 112, including URL 113, to browser 103. Browser 103 receives RTSP notification 112 from RTSP server 102. RTSP notification 112 notifies browser 103 (and possibly also user 121) that RTSP stream 111A is accessible via URL 113. However, browser 103 may incompatible with RTSP streams or user 121 and/or browser 103 may simply prefer HLS streams.

As such, browser 103 forwards URL 113 to HLS server 104. HLS server 104 receives URL 113 from browser 103. HLS server 104 then sends RTSP pull request 114, including URL 113, to RTSP server 102. RTSP server 102 receives RTSP pull request 114 from HLS server 104. In response to receiving RTSP pull request 114, RTSP server 102 utilizes URL 113 to access RTSP stream 111A. RTSP server 102 then transfers RTSP stream 111B (essentially RTSP stream 111A but possibly with different parameters) to HLS server 104. HLS server 104 receives RTSP stream 111B from RTSP server 102. HLS server 104 converts RTSP stream 111B to corresponding HLS stream 115. HLS server 104 transfers HLS stream 115 to browser 103. Browser 103 receives HLS stream 115 from HLS server 104 and outputs HLS stream 115.

Beneficially, a stream that was initially transferred in an RTSP format (RTSP stream 111A) is converted to HLS (HLS stream 115) and delivered to an end-point (browser 103) in a manner that in many ways overcomes previously described difficulties. Unfortunately, there can be significant network overhead associated with coordinating network communication between RTSP server 102, browser 103, and HLS server 104. Further, RTSP stream 111 is essentially transferred multiple times (as 111A and 111B) consuming additional network bandwidth and time. Camera 103 transfers RTSP stream 111A to RTSP server 102. Subsequently, RTSP server 102 transfers RTSP stream 111B to HLS server 104. The network overhead and multiple stream transfers can cause latencies of up to 30 seconds from the time browser 103 receives RTSP notification 112 to the time browser 103 receives initial portions HLS stream 115.

It may also be difficult for user 121 to terminate streaming all together. For example, user 121 can send a command to HLS server 104 to terminate HLS stream 115. In response, HLS server 104 can terminate HLS stream 115 and possibly also RTSP stream 111B. However, terminating HLS stream 115 does not concurrently stop camera 101 from creating content and/or continuing to transfer created content via RTSP stream 111A to RTSP server 102. Thus, network bandwidth can be consumed transferring created content via RTSP stream 111A, at least for some amount of time, even when the created content is no longer being output at an end-point (since HLS stream 115 was terminated).

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for converting an RTSP coordinated stream into an HLS stream.

A media streaming server participates in an RTSP coordinated stream with a content creating electronic device (e.g., a camera). The content creating electronic device creates RTSP stream data and at least partially coordinates the RTSP coordinated stream. The media streaming server receives a portion of RTSP stream data corresponding to the RTSP coordinated stream directly from the content creating electronic device. The media streaming server converts the portion of RTSP stream data into HLS stream data. The media server participates in an HLS stream with an end-point during participating in the RTSP coordinated stream with the content originating electronic device. For example, the media streaming server can essentially simultaneously participate in both the RTSP stream with the content creating electronic device and the HLS stream with the end-point. The media streaming server sends the HLS stream data via the HLS stream to the end-point.

The end-point or an end-point user may subsequently request termination of content streaming. For example, the end-point user can submit a terminate command to the end-point or the end-point can automatically determine streaming is no longer appropriate. The end-point can formulate an HLS terminate instruction and send the HLS terminate instruction to the media streaming server. In response to the HLS terminate instruction, the streaming media server can coordinate termination of both the RTSP coordinated stream and the HLS stream.

Figure 1A:
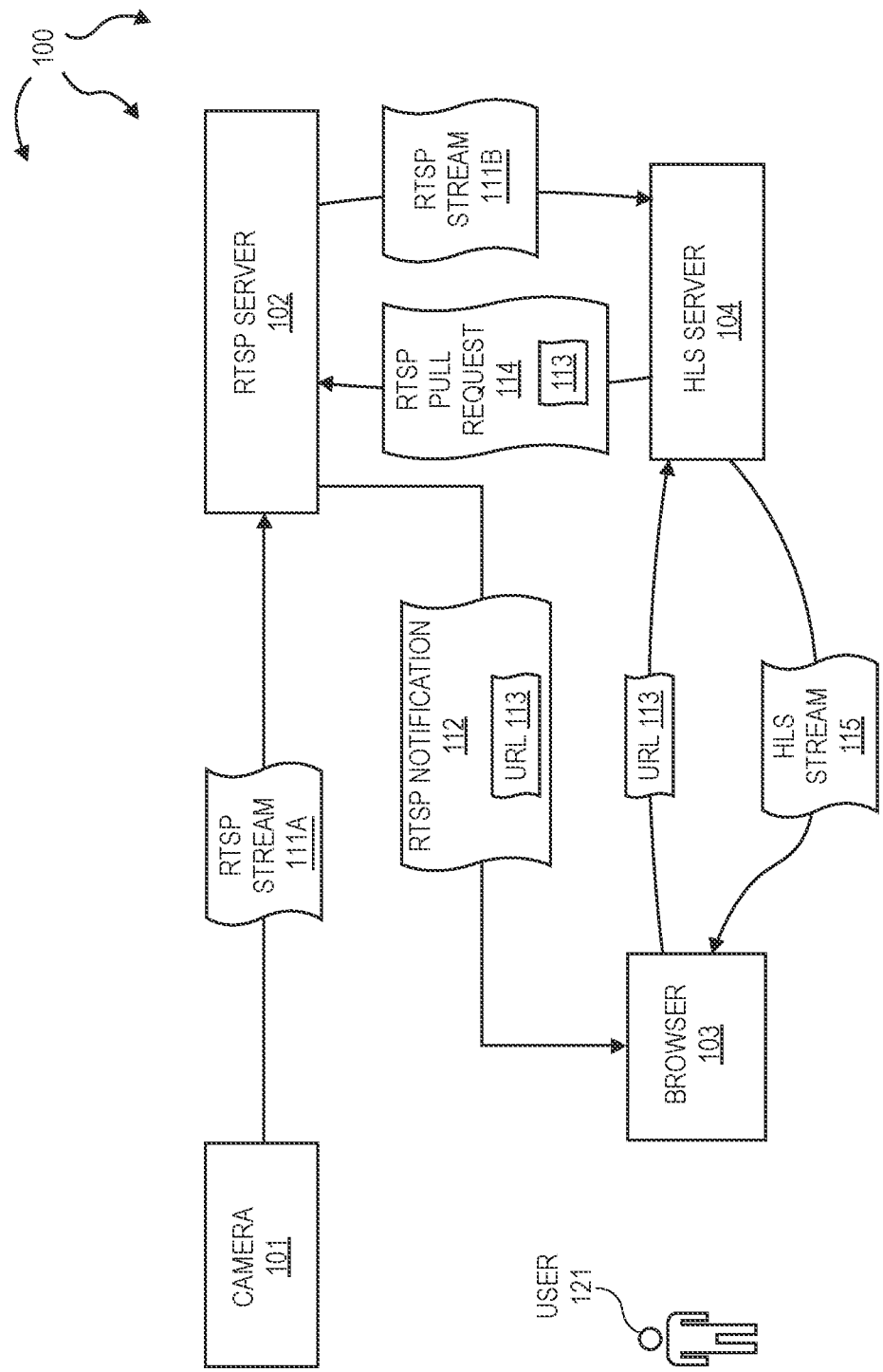
FIG. 1A depicts a prior art network arrangement utilized to convert an RTSP based stream to an HLS stream.
Figure 1B:
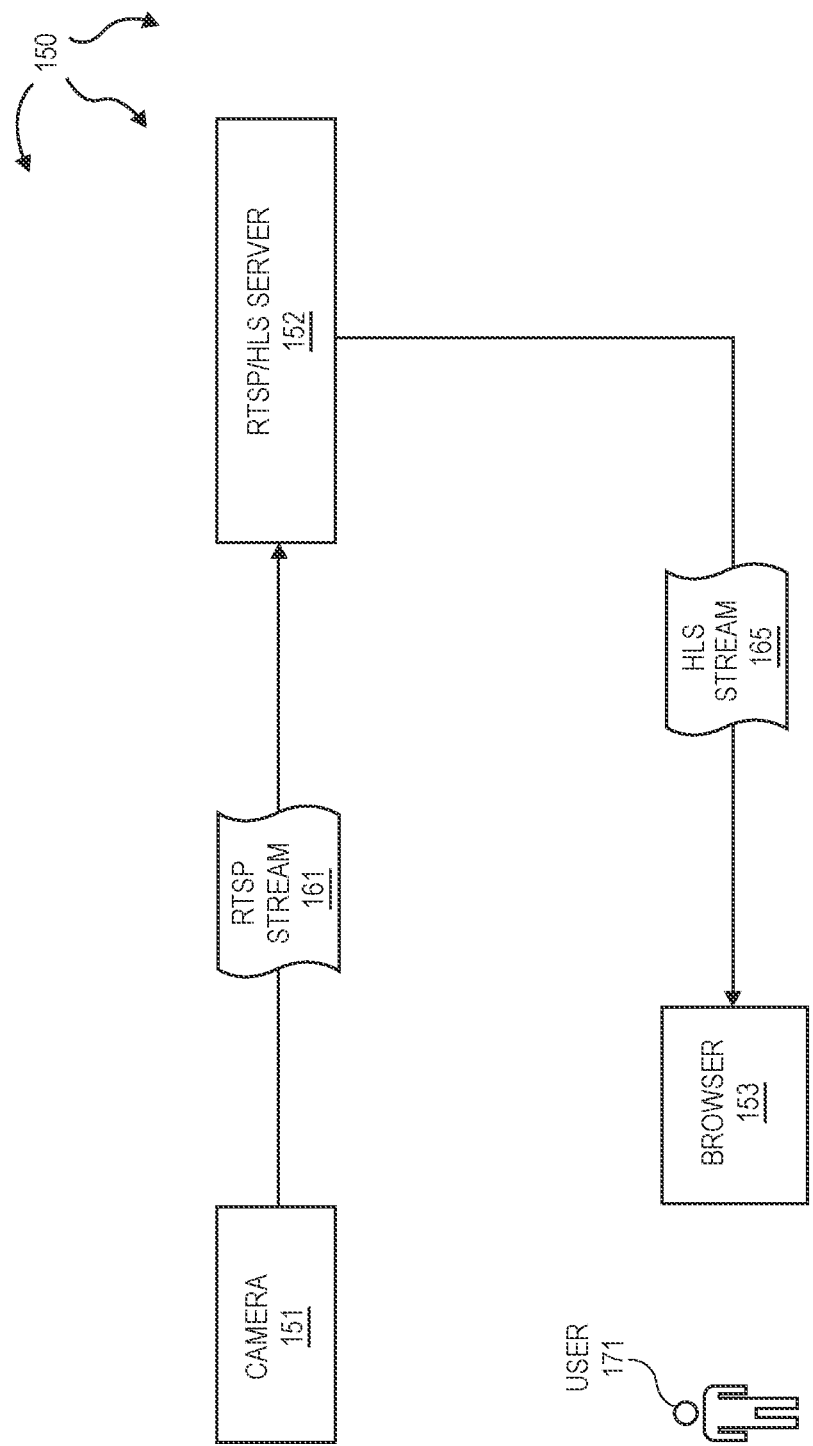
FIG. 1B illustrates an example computer architecture that facilitates converting an RTSP coordinated stream into an HLS stream.

FIG. 1B illustrates an example computer architecture 150 that facilitates converting an RTSP coordinated stream into an HLS stream. Camera 151 creates content. For example, components in camera 151 (e.g., sensors, lenses, processors, etc.) interoperate to capture audio and/or video content. Camera 151 transfers the created content to RTSP/HLS server 152 in RTSP stream 161 (e.g., an audio/video stream).

Upon ingesting RTSP stream 161, RTSP/HLS sever 152 locally converts RTSP stream 161 to HLS stream 165. RTSP/HLS server 152 sends HLS stream 165 to browser 153. Browser 153 receives HLS stream 165 from RTSP/HLS server 152 and outputs HLS stream 165, for example, to user 171.

Advantageously, RTSP stream 161 is converted to HLS stream 165 in a manner that minimizes network communication through intermediaries and conserves network bandwidth and time. Correspondingly, latencies associated with receiving HLS stream 165 at browser 153 are reduced. Further, user 171 can more efficiently terminate streaming via communication with RSTP/HLS server 152.

Figure 2:
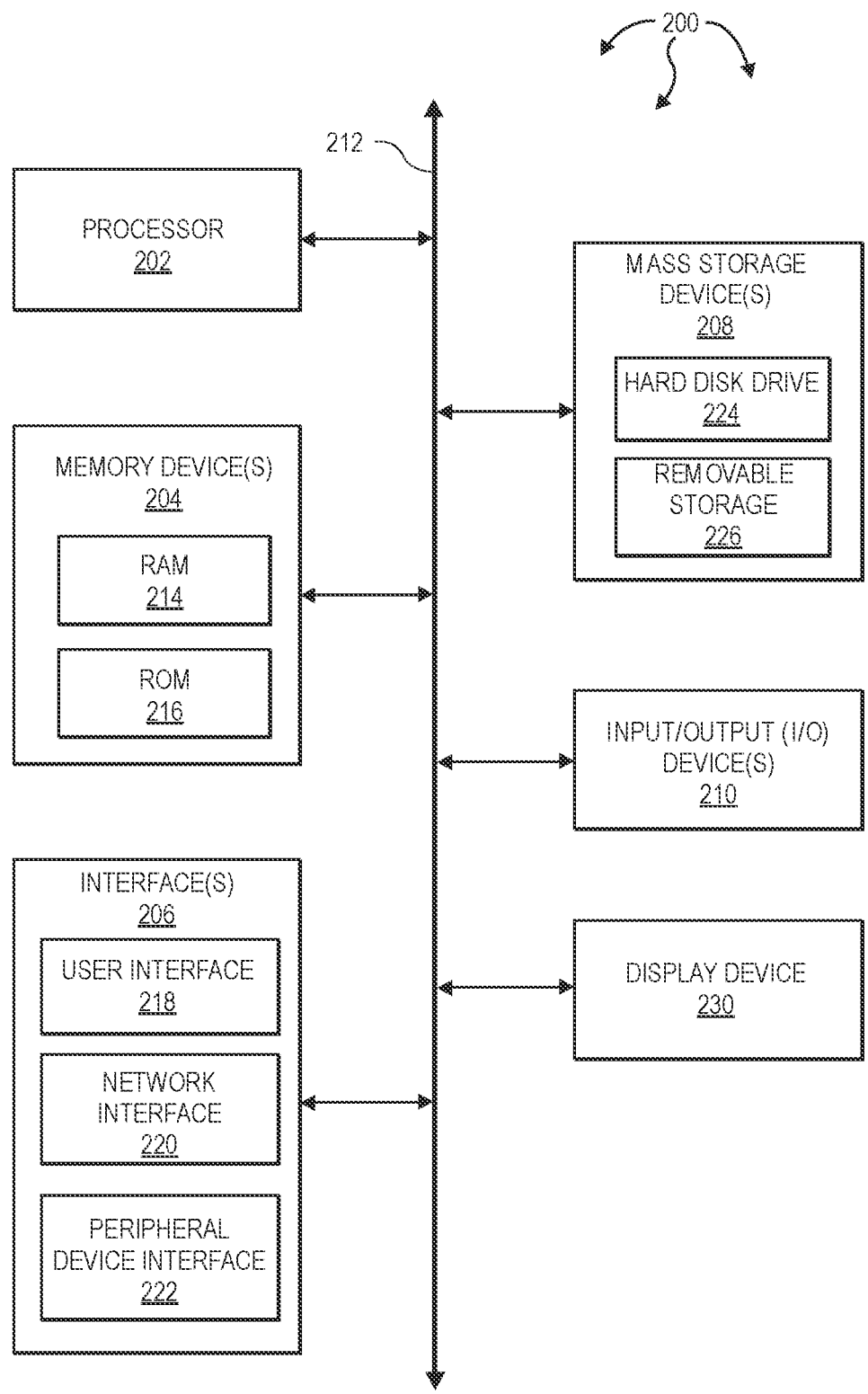
FIG. 2 illustrates an example block diagram of a computing device.

FIG. 2 illustrates an example block diagram of a computing device 200. Computing device 200 can be used to perform various procedures, such as those discussed herein. Computing device 200 can function as a server, a client, or any other computing entity. Computing device 200 can perform various communication and data transfer functions as described herein and can execute one or more application programs, such as the application programs described herein. Computing device 200 can be any of a wide variety of computing devices, such as a mobile telephone or other mobile device, a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer storage media, such as cache memory. Processor(s) 202 can be real or virtual and can be allocated from on-premise, cloud computing, or any cloud provider resources.

Memory device(s) 204 include various computer storage media, such as volatile memory (e.g., random access memory (RAM) 214) and/or nonvolatile memory (e.g., read-only memory (ROM) 216). Memory device(s) 204 may also include rewritable ROM, such as Flash memory. Memory device(s) 204 can be real or virtual and can be allocated from on-premise, cloud computing, or any cloud provider resources.

Mass storage device(s) 208 include various computer storage media, such as magnetic tapes, magnetic disks, optical disks, solid state memory/drives (e.g., Flash memory), and so forth. As depicted in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media. Mass storage device(s) 208 can be real or virtual and can be allocated from on-premise, cloud computing, or any cloud provider resources.

I/O device(s) 210 include various devices that allow data and/or other information to be input to or retrieved from computing device 200. Example I/O device(s) 210 include cursor control devices, keyboards, keypads, barcode scanners, microphones, monitors or other display devices, speakers, printers, network interface cards, modems, cameras, lenses, radars, CCDs or other image capture devices, and the like. I/O device(s) 210 can be real or virtual and can be allocated from on-premise, cloud computing, or any cloud provider resources.

Display device 230 includes any type of device capable of displaying information to one or more users of computing device 200. Examples of display device 230 include a monitor, display terminal, video projection device, and the like. Display device 230 can be real or virtual and can be allocated from on-premise, cloud computing, or any cloud provider resources.

Interface(s) 206 include various interfaces that allow computing device 200 to interact with other systems, devices, or computing environments as well as humans. Example interface(s) 206 can include any number of different network interfaces 220, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 218 and peripheral device interface 222. Interface(s) 206 can be real or virtual and can be allocated from on-premise, cloud computing, or any cloud provider resources.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 2394 bus, USB bus, and so forth. Bus 212 can be real or virtual and can be allocated from on-premise, cloud computing, or any cloud provider resources.

"Real Time Streaming Protocol" (RTSP) is a network protocol configured to coordinate and control media devices. RTSP can be used to establish and control media session between devices. Client devices can issue commands, such as, play, record, pause, to facilitate real-time control of media streams (e.g., audio/visual content). RTSP can use other protocols, such as, for example, Real-time Transport Protocol (RTP) in conjunction with Real-time Control Protocol (RTCP) for media stream delivery. However, RTSP can also use other transport protocols to facilitate media stream delivery.

In this description and the following claims, "RTSP based protocols" are defined as other protocols (e.g., transport, control, etc.) that are used along with RTSP to facilitate media stream delivery.

In this description and the following claims, an "RSTP coordinated stream" is defined as a media stream coordinated using RTSP and/or RTSP based protocols.

"Hyper Text Transfer Protocol" HTTP is an application layer protocol for distributed, collaborative, hypermedia information systems. HTTP is a foundational data communication protocol used on the Internet. HTTP facilitates use of hypertext documents that include hyperlinks to other resources that a user can access, for example by a mouse click or by tapping the screen in a web browser.

"HTTP Live Streaming" (HLS) is an HTTP based adaptive bitrate streaming communications protocol. HLS is used in media players, web browsers, mobile devices, streaming media servers, etc. HLS can use a web server to distribute audio/visual content. HLS provides mechanisms for players to adapt to unreliable network conditions without causing user-visible playback stalling, including falling back to lower quality video. In this description and the following claims, HLS is defined to include Apple Low Latency HLS (ALHLS) and "Community LHLS" (LHLS).

In this description and the following claims, a "HLS stream" is defined as a media stream using HLS.

Figure 3A:
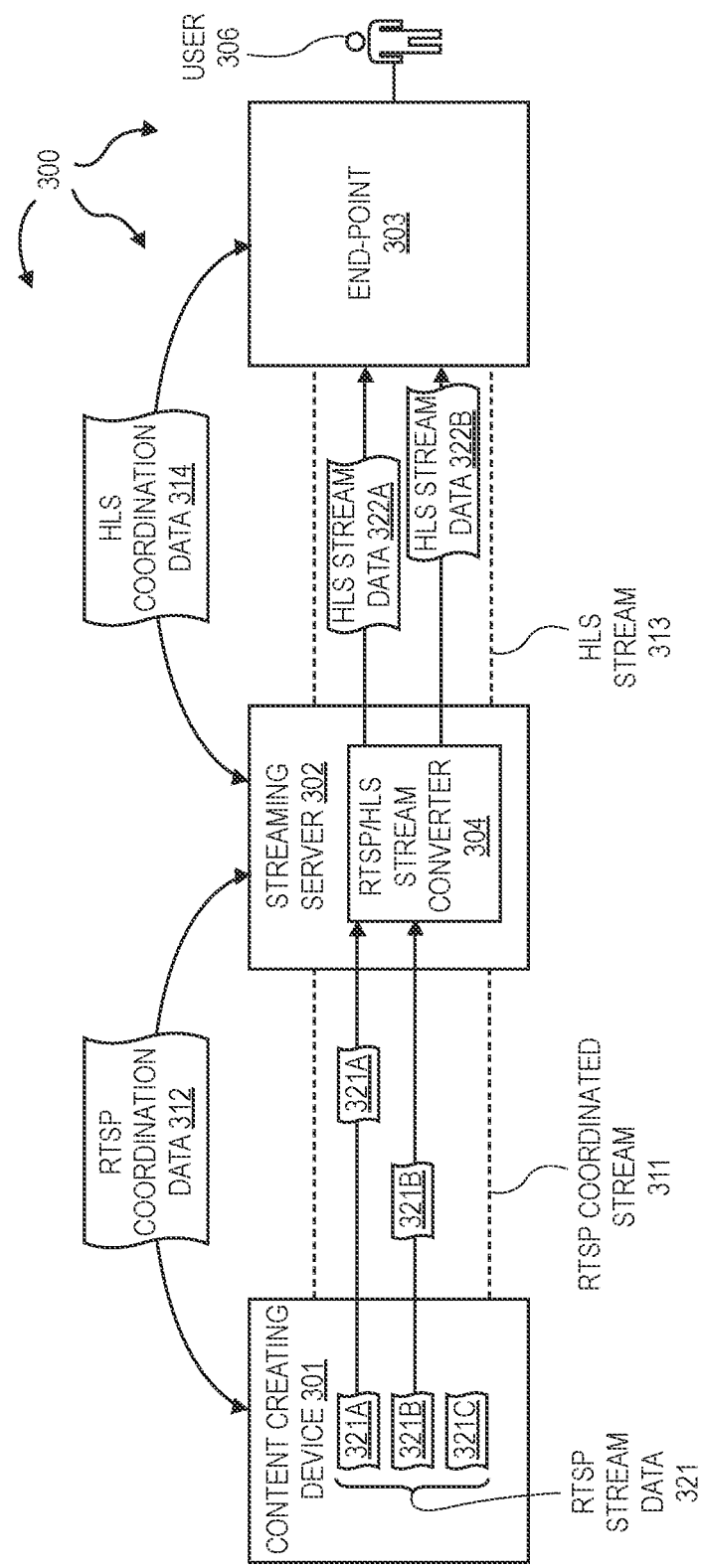
FIG. 3A illustrates an example computer architecture that facilitates converting an RTSP coordinated stream into an HLS stream.

FIG. 3A illustrates an example computer architecture 300 that facilitates converting an RTSP coordinated stream into an HLS stream. As depicted, computer architecture 300 includes content creating device 301, streaming server 302, and end-point 303. In one aspect, content creating device 301 is a camera (e.g., camera 151) and end-point 303 is a Web browser (e.g., browser 153). The camera can may be configured for a specific use, such as, security, traffic monitoring, crowd monitoring, etc.

Streaming server 302 can receive an RTSP coordinated stream from a content creating device. Streaming server 302 further includes RTSP/HLS stream converter 304. RTSP/HLS stream converter 304 is configured to convert a received RTSP coordinated stream into an HLS stream. Streaming server 302 can then send the HLS stream to an end-point. For example, RTSP/HLS stream converter 304 can re-format data included in a received RTSP stream into a format compatible with HLS. Streaming server 302 can then include the re-formatted content in an output HLS stream to an end-point.

In one aspect, described functionality of streaming server 302 is included in RTSP/HLS server 152.

In general, content creating device 301 can stream created content to streaming server 302 via RTSP coordinated streams on-demand, on a continuing basis, or in response to user commands. Content creating device 301 can including components, such as, for example, sensors, lenses, condensers, etc., configured to capture audio/video content. Content creating device 301 can also include interoperating (and possibly hard coded/fixed) internal components (e.g., hardware, firmware, software, etc.) configured to stream captured audio/video content via RTSP coordinated streams.

In one aspect, content creating device 301 includes RTSP functionality and lacks HLS functionality. However, also in this one aspect, end-point 303 can be configured with, and may even prefer utilizing, HLS functionality and/or may lack RTSP functionality.

As depicted, content creating device 301 and streaming server 302 exchange RTSP coordination data 312 (possibly on an ongoing basis) to maintain RTSP coordinated stream 311. Content creating device 301 can stream data to streaming server 302 via RTSP coordinated stream 311. Also, as depicted, end-point 303 and streaming server 302 exchange HLS coordination data 312 (possibly on an ongoing basis) to maintain HLS stream 313. Streaming server 302 can stream data to end-point 303 via HLS stream 313.

In general, streaming server 302 can receive RTSP content via RTSP coordinated stream 311 from content creating device 301. RTSP/HLS stream converter 304 can convert the RTSP content into HLS content. Streaming server 302 can send the HLS content via HLS stream 313 to end-point 303. End-point 303 can output the HLS content, for example, via a monitor and/or speakers, to user 306.

Figure 4:
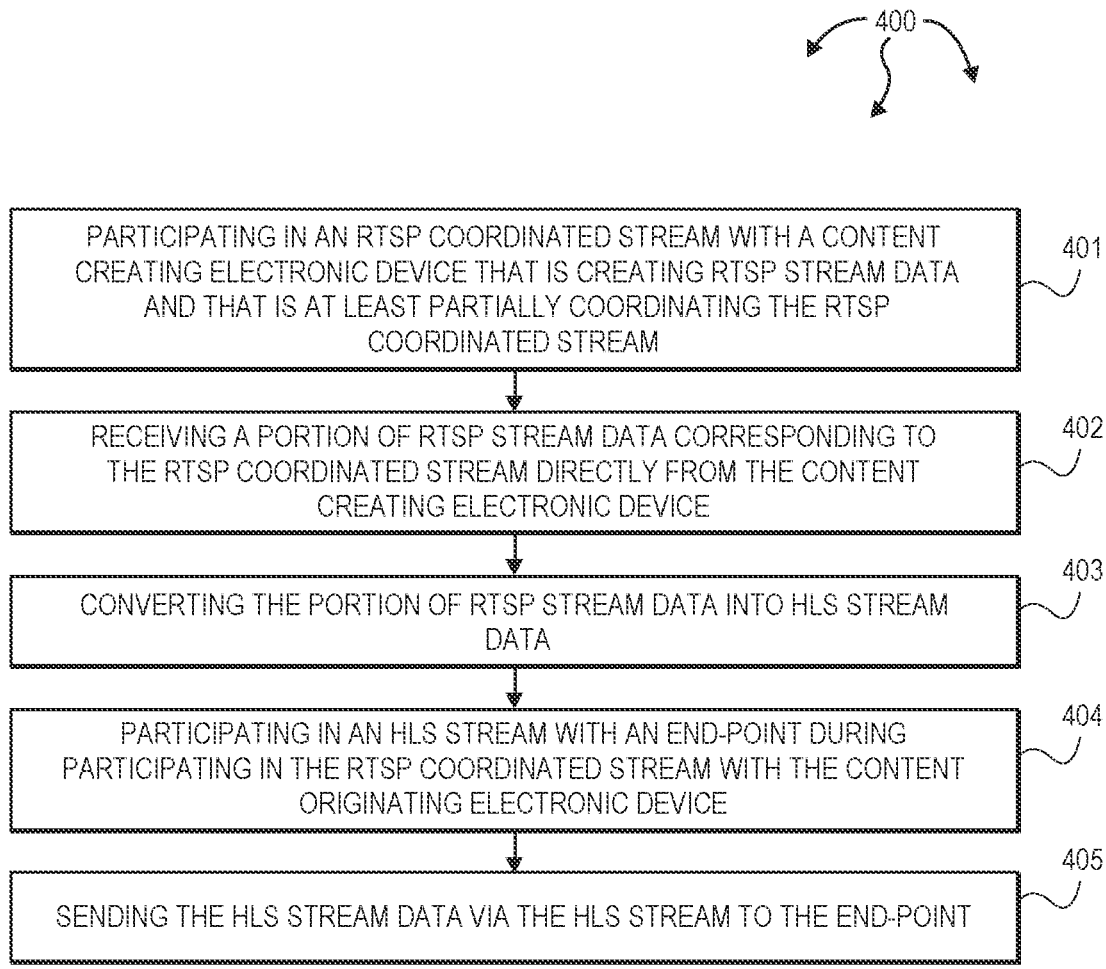
FIG. 4 illustrates a flow chart of an example method for converting an RTSP coordinated stream into an HLS stream.

FIG. 4 illustrates a flow chart of an example method 400 for converting an RTSP coordinated stream into an HLS stream. Method 400 will be described with respect to the components and data in computer architecture 300.

Method 400 includes participating in an RTSP coordinated stream with a content creating electronic device that is creating RTSP stream data and that is at last partially coordinating the RTSP coordinated stream (401). For example, streaming server 302 can participate in RTSP coordinated stream 311 with content creating device 301. Content creating device 301 can be capturing RTSP stream data 321, including capturing RTSP stream data portions 321A, 321B, 321C, etc. Content creating device 301 and streaming server 302 can each be at least partially coordinating RTSP coordinated stream 311 through exchange of RTSP coordination data 312.

Method 400 includes receiving a portion of RTSP stream data corresponding to the RTSP coordinated stream directly from the content creating electronic device (402). For example, content creating device 301 can send RTSP stream data portions 321A, 321B, etc., to streaming server 302 via RTSP coordinated stream 311. Streaming server 302 can receive RTSP stream data portions 321A, 321B, etc. from content creating device 301 via RTSP coordinated stream 311.

Method 400 includes converting the portion of RTSP stream data into HLS stream data (403). For example, RTSP/HLS stream converter 304 can convert RTSP stream data portions 321A, 321B, etc. into HLS stream data 322A, 322B, etc.

Method 400 includes participating in an HLS stream with an end-point during participating in the RTSP coordinated stream with the content originating electronic device (404). For example, streaming server 302 can participate in HLS stream 313 with end-point 303 during (and essentially simultaneously with) participating in RTSP coordinated stream 311 with content creating device 301. End-point 303 and streaming server 302 can each be at least partially coordinating HLS stream 313 through exchange of HLS coordination data 314.

Method 400 includes sending the HLS stream data via the HLS stream to the end-point (405). For example, streaming server 302 can send HLS stream data 322A, 322B, etc. via HLS stream 313 to end-point 303.

End-point 303 can output HLS stream data 322A, 322B, etc. via a monitor and/or speakers, for example, to user 306. In one aspect, end-point 303 is included in a security or monitoring station. User 306 can monitor content originally captured by content creating device (and streamed through and converted at streaming server 302) for anomalies, occurrences of specified events, etc. at the security or monitoring station.

As depicted in computer architecture 300, stream conversion occurs at streaming server 302 that directly participates in streams with both content creator 301 and end-point 303 (no intermediary systems are included). Accordingly, network overhead associated with stream delivery and stream coordination is minimized, conserving network bandwidth and reducing latency.

Figure 3B:
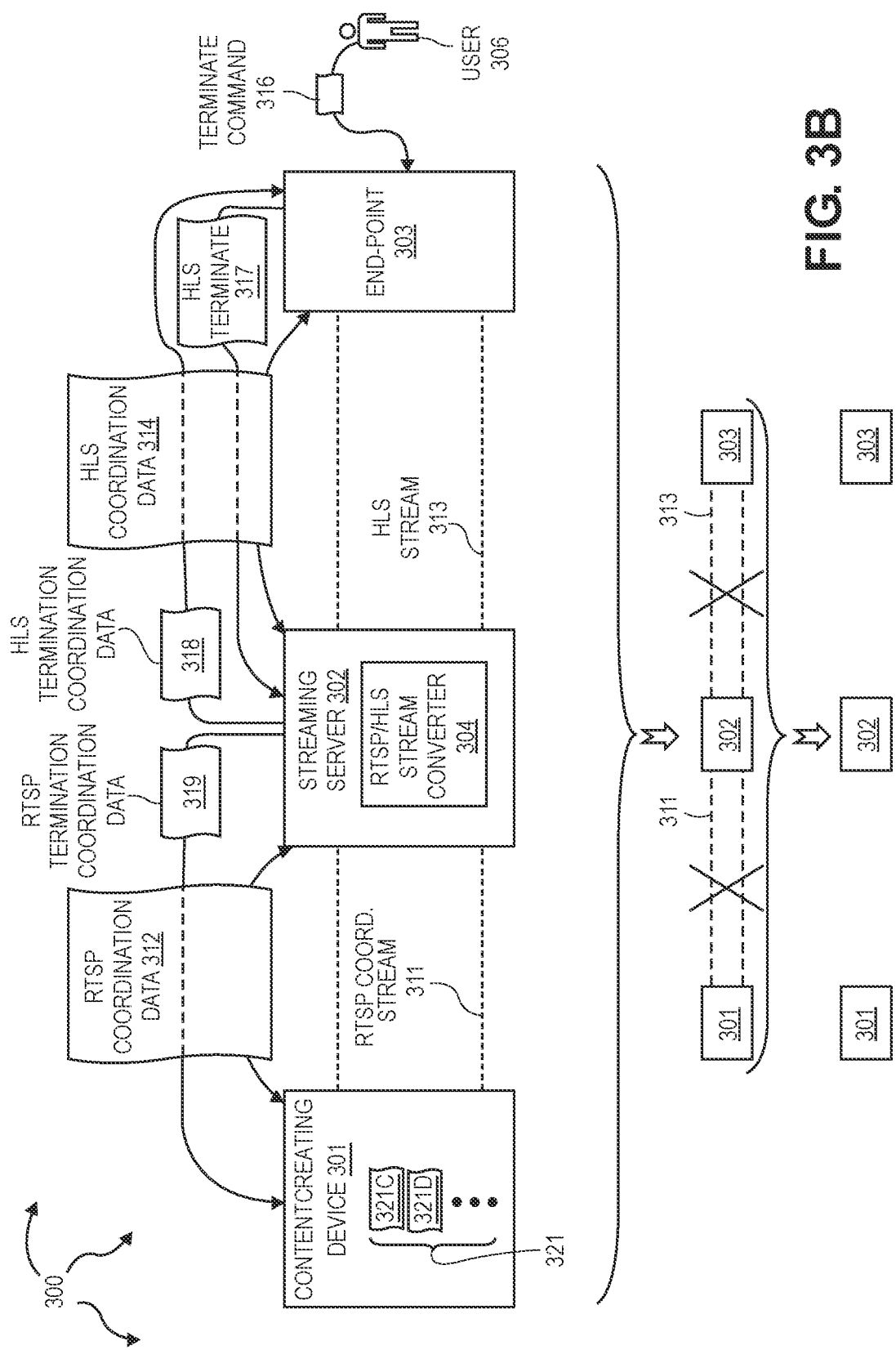
FIG. 3B illustrates the example computer architecture that facilitates terminating the RTSP coordinated stream and the HLS stream.

FIG. 3B illustrates computer architecture 300 that facilitates terminating the RTSP coordinated stream and the HLS stream. Subsequent to streaming of HLS stream data 322A, 322B, etc., it may be that captured content from content creating device 301 is no longer of interest to user 306 and/or to end-point 303 or that streaming captured content is otherwise no longer appropriate.

In one aspect, user 306 sends terminate command 316 to end-point (e.g., through a user interface). End-point 303 receives terminate command 316 and, in response, formulates HLS terminate instruction 317. In another aspect, end-point 303 formulates HLS terminate instruction 317 based on other conditions, and without input from user 306. For example, end-point 303 can formulate HLS terminate instruction 317 in response to network conditions, expiration of a timer, detecting transition to another stream (other than HLS stream 313), etc.

Figure 5:
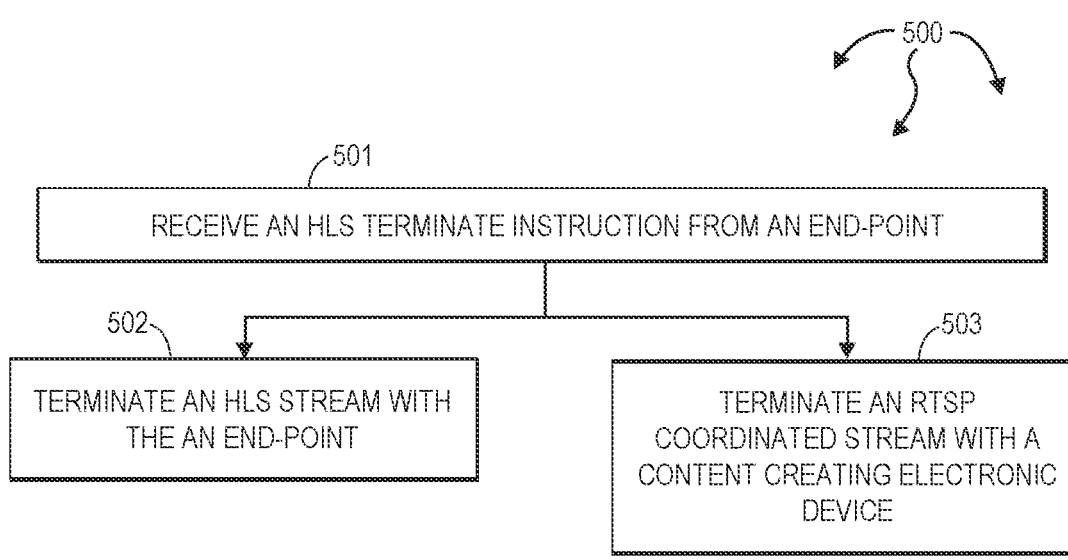
FIG. 5 illustrates a flow chart of an example method for terminating both an RTSP coordinated stream and an HLS stream in response to an HLS terminate instruction.

FIG. 5 illustrates a flow chart of an example method 500 for terminating both an RTSP coordinated stream and an HLS stream in response to an HLS terminate instruction. Method 500 will be described with respect to the components and data in computer architecture 300.

Method 500 includes receiving a terminate command to terminate streaming (501). For example, end-point 303 can send HLS terminate instruction 317 to streaming server 302 through HLS coordination data 314. Streaming server 302 can receive HLS terminate instruction 317 from end-point 303 through HLS coordination data 314.

Method 500 includes, in response to the terminate command, terminating the RTSP coordinated stream with the content creating electronic device (502). For example, streaming server 302 can send RTSP termination coordination data 319 to content capturing device 301 through RTSP coordination data 312. Content capturing device 301 can receive RTSP termination coordination data 319 from streaming server 302 through RTSP coordination data 312. Thus, triggered by streaming server 302, content creating device 301 and streaming server 302 can coordinate orderly termination of RTSP coordinated stream 311.

Method 500 includes, in response to the terminate command, terminating the HLS stream with the end-point (503). For example, streaming server 302 can send HLS termination coordination data 318 to end-point 303 through HLS coordination data 314. End-point 303 can receive HLS termination coordination data 318 from streaming server 302 through HLS coordination data 314. Thus, triggered by streaming server 302, end-point 303 and streaming server 302 can coordinate orderly termination of HLS stream 313.

Streaming server 302 can concurrently (and potentially essentially simultaneously) terminate RTSP coordinated stream 311 and terminate HLS stream 313.

As described, streaming server 302 directly participates in streams with both content creator 301 and end-point 303 (no intermediary systems are included). As such, streaming can be more efficiently and effectively terminated. Extraneous streaming from content creating device 301 to streaming server 302 (e.g., when user 306 and/or end-point 303 are no longer interested) is minimized, conserving network bandwidth.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives (SSDs) (e.g., RAM-based or Flash-based), Shingled Magnetic Recording (SMR) devices, storage class memory (SCM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: captured content, RTSP stream data, RTSP coordination data, RTSP coordinated streams, HLS stream data, HLS coordination data, HLS streams, terminate commands, HLS terminate instructions, RTSP termination coordination data, HLS termination coordination data, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, captured content, RTSP stream data, RTSP coordination data, RTSP coordinated streams, HLS stream data, HLS coordination data, HLS streams, terminate commands, HLS terminate instructions, RTSP termination coordination data, HLS termination coordination data, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on premise and public, a combination of private and public, a combination of two different public cloud deployment models, etc. Thus, resources utilized in a hybrid cloud can span different locations, including on premise, private clouds, (e.g., multiple different) public clouds, etc.

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method, comprising:
   participating, by a server, in an RTSP coordinated stream with a content creating electronic device that is creating RTSP stream data and that is at least partially coordinating the RTSP coordinated stream, wherein the participating comprises:
      exchanging, by the server, on an ongoing basis, RTSP coordination data with the content creating electronic device to maintain the RTSP coordinated stream;
   receiving, by the server, a portion of RTSP stream data corresponding to the RTSP coordinated stream directly from the content creating electronic device;
   converting, by the server, the portion of RTSP stream data into HLS stream data;
   participating, by the server, simultaneously in an HLS stream with an end-point and in the RTSP coordinated stream with the content creating electronic device, wherein the participating in the HLS stream comprises:
      exchanging, by the server, on an ongoing basis, HLS coordination data with the end-point to maintain the HLS stream;
   sending, by the server, the HLS stream data via the HLS stream to the end-point;
   receiving a terminate command to terminate streaming;
   concurrently sending, by the server, RTSP termination coordination data as part of the RTSP coordination data to the content creating electronic device, and HLS termination coordination data as part of the HLS coordination data to the end-point; and
   concurrently terminating the RTSP coordinated stream with the content creating electronic device and the HLS stream with the end-point,
   wherein the RTSP coordination data is exchanged through a channel that is different from the RTSP coordinated stream, and the HLS coordination data is exchanged through a channel that is different from the HLS stream.

2. The method of claim 1, wherein the content creating electronic device comprises a camera.

3. The method of claim 2, wherein the end-point comprises a Web browser.

4. The method of claim 1, wherein the end-point comprises a Web browser.

5. The method of claim 1, wherein receiving the portion of RTSP stream data comprises receiving audio/video data; and
   wherein converting the portion of RTSP stream data into HLS stream data comprises converting the audio/video data into HLS stream data.

6. A system, comprising:
   a processor of a server; and
   a memory coupled to the processor and storing instructions configured to cause the processor to perform operations comprising:
   participating in an RTSP coordinated stream with a content creating electronic device that is creating RTSP stream data and that is at least partially coordinating the RTSP coordinated stream, wherein the participating comprises:
      exchanging, by the server, on an ongoing basis, RTSP coordination data with the content creating electronic device to maintain the RTSP coordinated stream;
   receiving a portion of RTSP stream data corresponding to the RTSP coordinated stream directly from the content creating electronic device;
   converting the portion of RTSP stream data into HLS stream data;
   participating simultaneously in an HLS stream with an end-point and in the RTSP coordinated stream with the content creating electronic device, wherein the participating in the HLS stream comprises:
      exchanging, by the server, on an ongoing basis, HLS coordination data with the end-point to maintain the HLS stream; and
   sending the HLS stream data via the HLS stream to the end-point;
   receiving a terminate command to terminate streaming;
   concurrently sending, by the server, RTSP termination coordination data as part of the RTSP coordination data to the content creating electronic device, and HLS termination coordination data as part of the HLS coordination data to the end-point; and
   concurrently terminating the RTSP coordinated stream with the content creating electronic device and the HLS stream with the end-point;
   wherein the RTSP coordination data is exchanged through a channel that is different from the RTSP coordinated stream, and the HLS coordination data is exchanged through a channel that is different from the HLS stream.

7. The system of claim 6, wherein the content creating electronic device comprises a camera.

8. The system of claim 7, wherein the end-point comprises a Web browser.

9. The system of claim 6, wherein the end-point comprises a Web browser.

10. The system of claim 6, wherein
receiving a portion of RTSP stream data comprises instructions configured to receive audio/video data; and wherein
converting the portion of RTSP stream data into HLS stream data comprises instructions configured to convert the audio/video data into HLS stream data.

* * * * *